United States Patent [19]

Eichenauer et al.

[11] Patent Number: 4,918,124
[45] Date of Patent: Apr. 17, 1990

[54] NOVEL COMPOSITION SUITABLE AS STABILIZERS FOR POLYMERS

[75] Inventors: Herbert Eichenauer, Dormagen; Alfred Pischtschan, Kuerten-Eichhof; Karl-Heinz Ott, Leverkusen, all of Fed. Rep. of Germany

[73] Assignee: Bayer Aktiengesellschaft, Leverkusen, Fed. Rep. of Germany

[21] Appl. No.: 931,429

[22] Filed: Nov. 17, 1986

[30] Foreign Application Priority Data

Nov. 30, 1985 [DE] Fed. Rep. of Germany ....... 3542468

[51] Int. Cl.$^4$ ................................................ C08K 5/13

[52] U.S. Cl. ..................................... 524/151; 524/255; 524/291; 524/343; 524/351

[58] Field of Search ...................... 526/224, 342, 346; 524/291, 343, 351, 255, 151; 525/87, 261

[56] References Cited

U.S. PATENT DOCUMENTS

| | | | |
|---|---|---|---|
| 3,915,942 | 10/1975 | Tamura | 526/224 |
| 3,928,498 | 12/1975 | Uraneck et al. | 525/261 |
| 4,354,007 | 10/1982 | Scott | 525/350 |

*Primary Examiner*—Veronica P. Hoke
*Attorney, Agent, or Firm*—Connolly and Hutz

[57] ABSTRACT

Stabilizing mixtures, acting synergistically, of phenolic antioxidants and sulphur-containing polymers having terminal thioalkyl groups.

7 Claims, No Drawings

NOVEL COMPOSITION SUITABLE AS STABILIZERS FOR POLYMERS

The present invention relates to mixtures, suitable as synergistic stabilizers, of phenolic antioxidants and sulphur-containing polymers having terminal thioalkyl groups, the mixtures having a limiting viscosity of 2–15 ml/g (measured in dimethyl formamide at 25° C.) and a sulphur content of 1.15 to 3.95 per cent by weight.

Synthethic polymers, particularly those having unsaturated bonds in the molecular chain, decompose under the action of oxygen, heat or light causing deterioration of the propertes and problems in the practical use of shaped articles produced from the polymers.

Numerous stabilizer mixtures for the prevention of such decomposition effects have already been described for polymers, including, combinations of sterically hindered phenols and sulphur-containing synergists. (cf. U.S. Pat. No. 4,321,191 and the literature cited therein).

It has now been found that mixtures of phenolic antioxidants and sulphur-containing polymers having terminal thioalkyl groups, a limiting viscosity of 2–15 ml/g (measured in dimethylformamide at 25° C.) and a sulphur content of 1.15–3.95% by weight constitute synergistically acting stabilizers for polymers, with good effectiveness, good polymer compatibility, low volatility and high stability to saponification.

The invention relates to compositions of (A) 1–99 parts by weight, preferably 10–90 parts by weight and particularly preferably 20–80 parts by weight, of a sulphur-containing polymer from styrene, α-methylstyrene, p-methylstyrene, vinyltoluene, acrylonitrile, methyl methacrylate, or mixtures thereof, having a limiting viscosity of 2–15 ml/g, preferably of 3–12 ml/g (measured in dimethylformamide at 25° C.), and a sulphur content of 1.15–3.95% by weight, preferably of 1.25–2.40% by weight, at least 90% by weight of the incorporated sulphur being present as a component of terminal $C_{1-18}$-thioalkyl groups, (B) 99–1 part by weight, preferably 90–10 parts by weight, and particularly preferably 80–20 parts by weight, of a phenolic antioxidant, (C) 0–50 parts by weight, preferably 0–45 parts by weight and particularly preferably 0–40 parts by weight, of a phosphorus-containing compound which acts in a stabilizing manner and D) 0–50 parts by weight, preferably 0–45 parts by weight and particularly preferably 0–40 parts by weight, of a nitrogen-containing compound which acts in a stabilizing manner.

Sulphur-containing polymers A in the context of the invention are, in particular, co- or terpolymers of (optionally nuclear- or side chain-substituted) styrene. These polymers can be prepared, in a manner known per se, by solution polymerization, suspension polymerization or emulsion polymerization or by a combination of these processes. Emulsion polymerization is preferred and can be carried out using anionic emulsifiers, such as, sodium, potassium or ammonium salts of long-chain fatty acids having 10–20 C atoms, for example potassium oleate, alkyl sulphates having 10–20 C atoms, alkylaryl sulphonates having 10–20 C atoms or alkali metal or ammonium salts of disproportionated abietic acid.

The polymerization can be carried out, preferably at 30° to 100° C., particularly preferably at 50 to 80° C. Suitable radical-generating initiators are organic and inorganic peroxides, inorganic persulphates such as, for example, potassium persulphate, azo initiators such as for example, azobisisobutyronitrile, and also redox systems comprising an oxidizing agent, preferably a peroxide, and a reducing agent. Potassium persulphate is employed as a preferred initiator. The catalysts can be employed in amounts of from 0.1 to 1.0% by weight based on the amount fo monomer).

The terminal thioalkyl groups can be introduced by polymerization of a mixture of monomers and $C_{1-18}$-alkylmercaptan, the mercaptan, which acts as a chain transfer agent, being incorporated as a terminal thioalkyl group.

The sulphur content introduced by means of the terminal thioalkyl groups must be at least 90% by weight of the total sulphur present in the polymer. The content of any sulphur which is derived from other sources in the polymer, (for example as a result of the incorporation of initiator fragments or as a result of grafting a sulphur-containing emulsifiers), is less than 10% by weight of the total sulphur content in the polymer.

Examples of $C_{1-18}$-alkyl mercaptans which can be employed are ethyl, n-propyl, n-butyl, t-butyl, n-pentyl, n-hexyl, n-octyl, n-decyl, n-dodecyl, t-dodecyl, n-hexadecyl and n-octadecyl mercaptan. Preferred alkyl mercaptans are t-dodecyl mercap-tan and n-dodecyl mercaptan, or mixtures thereof.

Phenolic antioxidants B, in the context of the invention, are compounds which contain at least one sterically hindered phenolic grouping.

Examples of such compounds are 2,6-di-t-butyl-4-methylphenol, 2,4,6-tri-t-butylphenol, 2,2'-methylene-bis-(4-methyl-6-t-butylphenol), 2,2'-thio-bis-(4-methyl6-t-butylphenol), 4,4'-thio-bis-(3-methyl-6-t-butylphenol, 4,4'-butylidene-bis-(6-t-butyl-3-methylphenol), 4,4'-methylene-bis-(2,6-di-t-butylphenol), 2,2'-methylene-bis[4-methyl-6-(1-methyxlcyclohexyl)phenol], tetrakis [methylene-3-(3,5-di-t-butyl-4-hydroxyphenyl)pro-pionate]methane, 1,3,5-trimethyl-2,4,6-tris(3,5-di-t-butyl-4-hydroxybenzyl)benzene, N,N'-hexame-thylenebis(3,5-di-t-butyl-4-hydroxy-hydrocinnamide), octadecyl 3-(3,5-di-t-butyl-4-hydroxyphenyl)propionate, 1,3,5-tris(3,5-di-t-butyl-4-hydroxyhenzyl) isocyanurate, 1,1,3-tris(5-t-butyl-4-hydroxy-2-methylphenyl)butane, 1,3,5-tris(3,5-di-t-butyl-4-hydroxybenzyl)mesitylene, ethylene glycol bis[3,3-bis(3'-t-butyl-4'-hydroxyphenyl)butyrate], 2,2'-thiodiethyl bis-3-(3,5-di-t-butyl-4-hydroxyphenyl)propionate, di-(3-t-butyl-4'-hydroxy-5-methylphenyl)-dicyclopentadien, 2,2'-methylene-bis-(4-methyl6-cyclohexylphenol), 1,6-hexanediol bis-3-(3,5-di-tbutyl-4-hydroxyphenyl)propionate, 2,4-bis(n-octyl-thio)-6-(4-hydroxy-3,5-di-t-butylanilino)-1,3,5-triazine, diethyl 3,5-di-t-butyl-4-hydroxybenzyl-phosphonate and triethyleneglycol bis-3-(t-butyl-4-hydroxy-5-methylphenyl)propionate.

The compositions according to the invention can contain, in addition, phosphorus-containing stabilizers C, such as, for example, distearylpentaerylthritol diphosphite, tris-(nonylphenyl) phosphite, tetrakis(2,4-di-t-butyl-phenyl-4-4'-biphenylylene diphosphonite, tris-(2,4-di-t-butylphenyl) phosphite, neopentyl glycol triethylene glycol diphosphite, diisodecylpentaerythritol diphosphite, tristearyl phosphite, trilauryl phosphite, triphenyl phosphite and/or nitrogen-containing stabilizrs D, preferably aromatic amines such as, for example, 4,4'-di-t-octyl-diphenylamine, 4,4'-di-(α-α-dimethylbenzyl)-diphenylamine, phenyl-B-naphthylamine, N-isopropyl-N'-phenyl-p-phenylenediamine, N-phenyl-2-naphthylamine and phenyl-2-aminonaphthalene.

Preferred sulphur-containing polymers A are products which have been produced by polymerization of a mixture of (a) 50–80 parts by weight, preferably 55–75 parts by weight of styrene, a-methylstyrene, and p-methylstyrene, vinyltoluene or mixtures thereof.

(b) 10–33 parts by weight, preferably 15–30 parts by weight, of acrylonitrile, methacrylonitrile or mixtures thereof and (c) 7.5–25 parts by weight, preferably 8–15 parts by weight, of t-dodecyl mercaptan, n-dodecyl mercaptan, or mixtures thereof, or of (a') 25–75 parts by weight, preferably 30 to 70 parts by weight, of styrene, a-methylstyrene, p-methylstyrene, vinyltoluene, or mixtures thereof, (b') 25–75 parts by weight, preferably 30 to 70 parts by weight, of methyl methacrylate and (c') 7.5–25 parts by weight, preferably 8 to 15 parts by weight, of t-dodecyl mercaptan, n-dodecyl mercaptan, or mixtures thereof, or of (a'') 10–60 parts by weight, preferably 20 to 50 parts by weight, of styrene, a-methylstyrene, p-methylstyrene, vinyltoluene or mixtures thereof (b'') 10–60 parts by weight, preferably 20–50 parts by weight, of methyl methacrylate, (c'') 10–30 parts by weight, preferably 5–27.5 parts by weight, of acrylonitrile, methacrylonitrile or mixtures thereof and (d'') 7.5 to 25 parts by weight, preferably 8–15 parts by weight, of t-dodecyl mercaptan, n-dodecylmercaptan, or mixtures thereof, or of (a''') 50–80 parts by weight, preferably 55–75 parts by weight, of methyl methacrylate (b''') 10–30 parts by weight of acrylonitrile, methacrylonitrile or mixtures thereof and (c''') 7.5–25 parts by weight, preferably 8–15 parts by weight of t-dodecyl mercaptan, n-dodecyl mercaptan, or mixtures thereof.

Preferred phenolic antioxidants B are 2,6-di-t-butyl-4-methylphenol, octadecyl 3-(3,5-di-t-butyl-4-hydroxyphenyl)-propionate, triethyleneglycol bis-3-)t-butyl-4-hydroxy-5-methylphenyl)propionate, 1,6-hexanediol bis-3-(3,5-di-t-butyl-4-hydroxyphenyl)-propionate, 2,4-bis(n-octylthio)-6-(4-hydroxy-3,5-di-t-butylanilino)-1,3,5-triazine, tetrakis[methylene-3-(3,5-di-t-butyl-4-hydroxyphenyl)-propionate]methane, 2,2'-thiodiethyl bis-[3,5-di-t-butyl-4-hydroxyphenyl)-propionate), 2,2'-methylene-bis(4-methyl-6-cyclohexylphenol), N,N'-hexamethylene-bis-(3,5-di-t-butyl-4-hydroxy-hydrocinnamide) and mixtures thereof.

Preferred phosphorus-containing compounds which act in a stabilizing manner are trisnonylphenyl phosphite and bisstearylpentaerythritol diphosphite.

Preferred nitrogen-containing compounds which act in a stabilizing manner are those which are derived from diphenylamine.

Particularly preferred stabilizing compositions are those comprising (A) 20–80% by weight of a polymer which has been prepared by free-radical reaction of 55–75 parts by weight of styrene, a-methylstyrene, or mixtures thereof, 15–30 parts by weight of acrylonitrile, methacrylonitrile or mixtures thereof, and 8–15 parts by weight of t-dodecyl mercaptan and (B) 80–20% by weight of a phenolic antioxidant, selected from the compounds 2,6-di-t-butyl-4-methylphenol, octadecyl 3-(3,5-di-t-butyl-4-hydroxyphenyl)-propionate, triehtyleneglycol bis-3-(t-butyl-4-hydroxy-5-methylphenyl)-propionate, tetrakis[methylene-3-(3,5-di-t-butyl-4-hydroxyphenyl) propionate]methane and 2,2'-methylene-bis(4-methyl-6-cyclohexylphenol), or mixtures thereof.

The stabilizer compositions, according to the invention, which act synergistically are suitable as means for the stabilization of polymers against oxidative decomposition or other changes caused by the action of oxygen.

Polymers which can be stabilized by the addition of the stabilizer combination are, for example, acrylonitrile/butadiene/styrene terpolymers (ABS), methyl methacrylate/butadiene/styrene terpolymers (MBS), styrene/arylonitrile copolymers (SAN), a-methylstyrene/acrylonitrile copolymers, polystyrene, high-impact polystyrene (HIPS), polymethyl methacrylate, polycarbonate, polycarbonate/ABS mixtures, polyphenylene oxide, polyphenylene oxide/HIPS mixtures, nylons, for example nylon 6, nylon 66 and nylon 12, polyesters, for example polyethylene terephthalate and polybutylene terphthalate and polybutylene terphthalate, polyolefins, for example polyethylene and polypropylen, polyacetals, polyurethanes, polybutadiene, styrene/butadiene rubbers, acrylonitrile,butadiene rubbers, polychloroprene, polyisoprene, butyl rubber, athylene/propylene/diene (EPDM) rubbers, acrylate rubbers, ethylene/vinyl acetate rubbers, vinylpyridine/butadien rubbers, vinylpyridine/styrene/-butadien rubbers, vinylpyridine/acrylonitrile/butadien rubbers, carboxylated rubbers and polyisobutylene.

The stabilizer compositions according to the invention display particular good effectiveness in the stabilization of ABS polymers, MBS polymers, styrene/acrylonitrile copolymers, a-methylstyrene/acrylonitrile copolymers, high-impact polystyrene, polylefins and rubber polymers.

The amounts of the stabilizer compositions according to the invention used are 0.1–15 parts by weight, preferably 0.5–12 parts by weight and particularly preferably 1–10 parts by weight (in each case relative to 100 parts by weight of the polymer to be stabilized).

In this case, the stabilizer composition can be added to the polymer material in solid for, as a solution or in the form of a dispersion or an emulsion. It is also possible here to add the individual components of the stabilizer composition to the polymer in different forms. Depending on the condition of the polymer to be stabilized, the incorporation occures by kneading, rolling, in emulsion or in solution.

The invention further relates to stabilized polymeric moulding materials, characterized in that they contain 0.1–15 parts by weight, preferably 0.5–12 parts by weight, and particularly preferably 1–10 parts by weight (in each case relative to 100 parts by weight of polymer) of the stabilizer composition from sulphur-containing polymer and phenolic antioxidant.

EXAMPLES AND COMPARION EXAMPLES

In the examples which follow, the invention is described in further detail. The parts stated are parts by weight and always relate to solid components of polymerizable components.

All DSC measurements were carried out using a Perkin Elmer DSC-2 measuring instrument (flushing gas oxygen 3.6 liter/h, heating rate for dynamic measurement 20 K/min). The following substances were employed when the experiments described below were carried out;

TABLE 1

Examples and comparison examples (cf. explanatory notes on page 13)

| Example No. | Polymer | Stabilizer | Incorporation of the stabilizer | Thermal stability during DSC measurements |
|---|---|---|---|---|
| | | | | $T_m$ [°C.] |
| 1(i) | (I) | 3A + 1C | aqueous emulsion | 225 |
| 2(c) | " | — | — | 201 |
| 3(c) | " | 3A | aqueous emulsion | 211 |
| 4(c) | " | 1C | " | 221 |
| 5(i) | (II) | 3A + 1E | aqueous emulsion | 240 |
| 6(c) | " | — | — | 192 |
| 7(c) | " | 3A | aqueous emulsion | 198 |
| 8(c) | " | 1E | " | 231 |
| 9(i) | (III) | 3A + 1B | aqueous emulsion | 240 |
| 10(c) | " | — | — | 228 |
| 11(c) | " | 3A | aqueous emulsion | 236 |
| 12(c) | " | 1B | " | 228 |
| | | | | $T_i$ [°C.] |
| 13(i) | (IV) | 3A + 1D | aqueous emulsion | 281 |
| 14(c) | " | — | — | 252 |
| 15(c) | " | 3A | aqueous emulsion | 258 |
| 16(c) | " | 1D | " | 260 |
| 17(i) | (V) | 3A + 1E | methylene chloride solution | 274 |
| 18(c) | " | — | — | 247 |
| 19(c) | " | 3A | methylene chloride solution | 254 |
| 20(c) | " | 1E | methylene chloride solution | 259 |

A sulphur-containing polymer, from styrene, acrylonitrile and t-dodecyl mercaptan, which is prepared as follows:

3.06 parts of styrene, 1.19 parts of acrylonitrile and 0.75 part of t-dodecyl mercaptan are emulsified under nitrogen together with 0.08 part of the sodium salt of disproportionated abietic acid in 68 parts of water, after which 0.3 part of potassium persulphate (dissolved in 24 parts of water) is added and the mixture is warmed to 65° C. A mixture of 58.14 parts of styrene, 22.61 parts of acrylonitrile and 14.25 parts of t-dodecyl mercaptan, and also a solution of 1.92 parts of the sodium salt of disproportionated abietic acid in 25 parts of water, are subsequently metered in over the course of 4 hours, the reaction temperature of 65° C. being maintained. After a post-reaction period of 4 hours, a part of the latex is coagulated in a cold magnesium sulphate/acetic acid solution. The polymer obtained after drying at 70° C. in vacuo has a sulphur content of 2.3% and a limiting viscosity of 6.7 ml/g (in dimethylformamide at 25° C.).

(B) 2,6-di-t-butyl-4-methylphenol
(C) Triethyleneglycol bis-3-(t-butyl-4-hydroxy-5-methylphenyl propionate (Ciba-Geigy Irganox 245)
(D) Tetrakis[methylene-3-(3,3,5-di-t-butyl-4-hydoryphenyl) propionate]methane (Ciba Geigy Irganox 1010)
(E) Octadecyl 3-(3,5-di-t-butyl-4-hydroxyphenyl)-propionate (Ciba Geigy Irganox 1076)
(F) 2,2'-Methylene-bis(4-methyl-6-cyclohexylphenol)
(G) Dilauryl thiodipropionate (Ciba-Geigy Irganox PS 800)

The polymers listed in Table 1 were stabilized using the stabilizers stated, and the resulting stability was determined via DSC measurement.

Explanatory notes for Table 1

Examples:

Explanatory notes for Table 1

| | |
|---|---|
| (i): | according to the invention |
| (c): | comparison |

Thermal stability during DSC measurements

| | |
|---|---|
| $F_m$: | maximum of the exothermic reaction during dynamic measurement |

Polymers used:

| | |
|---|---|
| (I): | Graft polymer of 36 parts by weight of styrene and 14 parts by weight of acrylonitrile on 50 parts by weight of polybutadiene |
| (II): | Polybutadiene |
| (III): | Butadiene/acrylonitrile - 68:32 copolymer |
| (IV): | Styrene/acrylonitrile - 72:28 copolymer |
| (V): | Polystyrene |

EXAMPLE 21 (ACCORDING TO THE INVENTION)

400 g of a graft polymer, of 36 parts by weight of styrene and 14 parts by weight of acrylonitrile on 50 parts by weight of polybutadiene, which had been stabilized in aqueous emulsion with a mixture of 3A+0.68+0.15F. (parts by weight per 100 parts by weight of polymer) were stored at a temperature of 140° C. in the presence of atmospheric oxygen. The start of an exothermic reaction was determined after a storage period of 65 hours.

EXAMPLE 22 (COMPARISON)

The experiment described in Example 21 was repeated, the graft polymer previously having been stabilized with a mixture of 1.05G+0.68+0.15F. The start of the exothermic reaction occurred, under identical storage conditions, after 18 hours.

It can be seen from the examples that the use of the stabilizer compositions according to the invention leads to markedly better oxidation stabilities of the polymers provided with the stabilizer.

We claim:
1. Stabilizer composition comprising

(A) 20-80 parts by weight of a sulphur-containing polymer from styrene, a-methylstyrene, p-methylstyrene, vinyltoluene, acrylonitrile, methyl methacrlyate, or mixtures thereof, having a limiting viscosity of 2-15 ml/g (measured in demthylformamin at 25° C.) and a sulphur content o 1.15-3.95% by weight, at least 90% by weight of the incorporated sulphur being present as a component of terminal $C_{1-18}$thioalkyl groups, (B) 80-20 parts by weight of a phenolic antioxidant.

2. Composition according to claim 1, containing additionally (C) 0-50 parts by weight of a phosphorus-containing compound which acts in a stabilizing manner and (D) 0-50 parts by weight of a nitrogen-containing compound which acts in a stabilizing manner.

3. Composition according to claim 1, wherein component A has been prepared by polymerization of a mixture of (a) 50-80 parts by weight, of styrene, α-methylstyrene, p-methylstyrene, vinyltoluene or mixtures thereof (b) 10-33 parts by weight, preferably 15-30 parts by weight, of acrylonitrile, methacrylonitrile or mixtures thereof and (c) an amount one or more $C_{1-18}$-alkyl mercaptans of 1.15-3.95 5 by weight in the polymer.

4. Composition according to claim 1, wherein component A has been prepared by polymerization of a mixture of (a) 50-80 parts by weight, preferably of styrene, α-styrene,
α-methyl-)styrene, p-methylstyrene, vinyltoluene, or mixtures thereof (b) 10-33 parts by weight of acrylonitrile, methacrylonitrile and or mixtures thereof (c) 7.5-25 parts by weight of t-dodecyl mercaptan, n-dodecyl mercaptan, or mixtures thereof.

5. A method of stabilizing polymers, which comprises adding to polymers a stabilizing effective amount of a composition according to claim 1.

6. Polymeric moulding materials, containing the stabilizing compositions according to claim 1 in amounts of 0.1-15% by weight, relative to the polymer.

7. Polymeric moulding materials, containing moulding materials according to claim 6, ABS polymers, MBS polymers, high-impact polystyrene, polyolefins and/or rubber polymers.

* * * * *